Figures 1, 2:
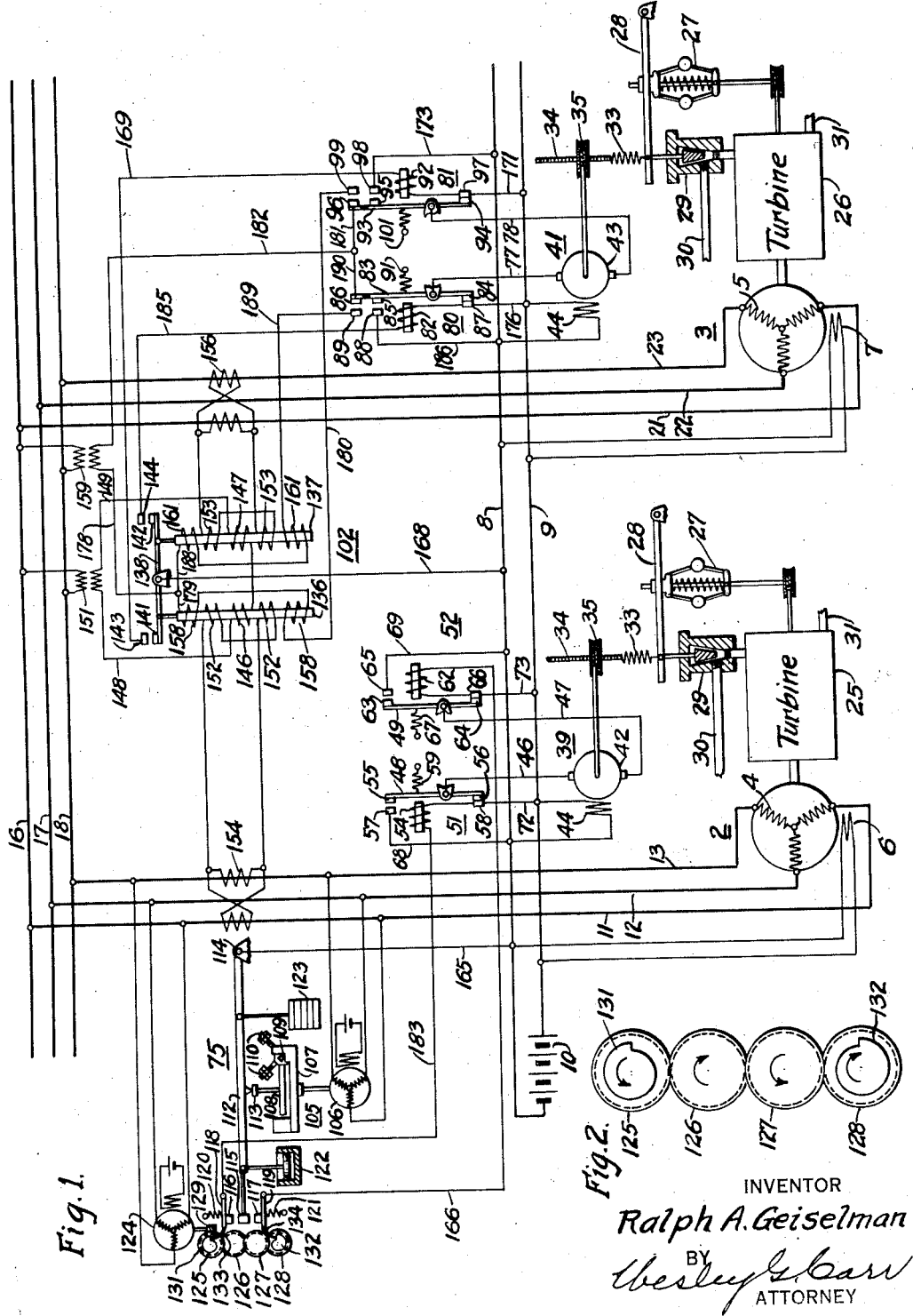

June 14, 1932. R. A. GEISELMAN 1,863,302
REGULATOR SYSTEM
Filed Sept. 22, 1930 3 Sheets-Sheet 1

INVENTOR
Ralph A. Geiselman
BY
ATTORNEY

June 14, 1932.　　　R. A. GEISELMAN　　　1,863,302
REGULATOR SYSTEM
Filed Sept. 22, 1930　　3 Sheets-Sheet 2

Fig. 3.

INVENTOR
Ralph A. Geiselman
BY
Wesley G. Carr
ATTORNEY

June 14, 1932.  R. A. GEISELMAN  1,863,302
REGULATOR SYSTEM
Filed Sept. 22, 1930   3 Sheets-Sheet 3

Fig. 4.

INVENTOR
Ralph A. Geiselman
BY
Wesley G. Carr
ATTORNEY

Patented June 14, 1932

1,863,302

UNITED STATES PATENT OFFICE

RALPH A. GEISELMAN, OF WILKINSBURG, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed September 22, 1930. Serial No. 483,490.

My invention relates to regulator systems and it has particular relation to systems for regulating the frequency of an electric power station or system and for controlling the division of load between a plurality of sources of power connected to an electric power system.

In a power station, the speeds of the generating units are controlled by speed governors which regulate the valve openings in the conduits supplying motive fluid to the prime movers. A particular valve opening corresponds approximately to a given amount of power supplied to the prime mover.

In a power station subject to varying load demands, an increase in load causes a decrease in speed of the prime movers and the generators, and a decrease in load demand causes an increase in the speed of the prime movers and the generators. A variation in the speed of the prime movers causes the frequency of the station or the system to vary.

It is very important that the frequency of the station be maintained substantially constant in order that the station may be easily synchronized with other electric power stations interconnected with said station and to minimize the synchronizing current flowing between the stations when they are so interconnected. It is also highly desirable that any increase in load on the station be divided between the various generating units in proportion to their respective ratings.

An object of my invention is to provide a regulating system that shall maintain the frequency of an electric power station substantially constant.

Another object of my invention is to provide a regulating system that shall maintain a predetermined load division between a plurality of sources of power connected to an electric power system.

My invention will be better understood by referring to the following description, when read in conjunction with the accompanying drawings, in which;

Figure 1 is a diagrammatic view of apparatus and circuits constituting one embodiment of my invention, Fig. 2 is an enlarged view of the gear train and cams employed in the practice of my invention, Figs. 3 and 4 are diagrammatic views of apparatus and circuits constituting further embodiments of my invention.

Referring to Fig. 1 of the drawings, a plurality of generators 2 and 3 are illustrated, each comprising armature windings 4 and 5 and field windings 6 and 7, respectively. The field windings 6 and 7 are energized from supply conductors 8 and 9 that are energized from any convenient source, such as a battery 10. The armature winding 4 of the generator 2 is connected, by means of conductors 11, 12 and 13, to circuit supply conductors 16, 17 and 18, and the armature winding 5 is connected to the conductors 16, 17 and 18 by means of conductors 21, 22 and 23.

The generators 2 and 3 are driven by prime movers, such as turbines 25 and 26, respectively, the speed of each prime mover being controlled by a governor mechanism 27 that controls the movement of a pivoted lever 28 and a valve 29 in the pen-stock or supply conduit 30, in accordance with the speed of the prime mover, to regulate the quantity of motive fluid supplied to the prime mover. Conduits 31 are provided for conducting the motive fluid away from the prime movers.

In order to vary the setting of each governor mechanism to thereby adjust the predetermined speed of the prime mover that the governor mechanism will maintain, a spring 33 is employed. One end of the spring 33 is attached to the lever 28 near its left-hand end, and the other end is affixed to a threaded member 34 that is free to move vertically in an interiorly threaded gear wheel 35. When the gear wheel 35 is actuated, the member 34 moves upwardly or downwardly, thereby varying the tension of the spring 33 which determines the setting of the governor 27, that is, the amount of motive fluid which the governor will permit to pass to the prime mover at a given prime-mover speed.

Motors 39 and 41 are provided for actuating the gear wheel 35 to vary the tension of the springs 33 associated with the prime movers 25 and 26, respectively. The motors 39 and 41 are provided with armature windings 42 and 43, respectively, and with field windings 44 that are energized from the conductors 8 and 9.

The armature winding 42 of the motor 39 is connected, by means of conductors 46 and 47, to movable contact arms 48 and 49 of reversing switches 51 and 52, respectively. The reversing switch 51 comprises the movable contact arm 48 and an electromagnet 54, the arm 48 carrying movable contact members 55 and 56 that cooperate, respectively, with stationary contact members 57 and 58. A biasing member 59 is provided for normally holding the cooperating contact members 56 and 58 in engagement. The reversing switch 52 is similar, in construction, to the switch 51 and comprises the movable contact arm 49 and an electro-magnet 62, movable contact members 63 and 64 that cooperate with stationary contact members 65 and 66 and a biasing member 67 for normally holding the cooperating contact members 64 and 66 in engagement.

The stationary contact members 57 and 65 of the reversing switches 51 and 52, respectively, are connected to the conductor 8 by means of conductors 68 and 69, respectively and are adapted to connect one side of the motor armature 42 to the conductor 8 upon the operation of one of the reversing switches to a second operative position and to connect the other side of the armature winding 42 to the conductor 8 upon the operation of the other reversing switch to its second operative position. The stationary contact members 58 and 66 of the switches 51 and 52, respectively, are connected to the conductor 9 by means of conductors 72 and 73, respectively.

When the reversing switches 51 and 52 are deenergized, the switches are in the positions illustrated in the drawings to close a circuit from one side of the armature winding 42, through conductor 46, the contact arm 48 and the cooperating contact members 56 and 58 of the reversing switch 51, conductor 72, conductor 9, conductor 73, cooperating contact members 66 and 64 and the contact arm 49 of the reversing switch 52 and conductor 47, to the other side of the armature winding 42, thus closing a dynamic-braking circuit for the motor 42. Upon the operation of the one or the other of the reversing switches 51 and 52 to its second operative position, the motor 39 is so connected to the conductors 8 and 9 as to be operated in the one or the other direction. The operation of the switches 51 and 52 is controlled by a frequency regulator 75.

The armature winding 43 of the motor 41 is connected, by means of conductors 77 and 78, to movable contact arms 83 and 93 of the reversing switches 80 and 81, respectively, that are illustrated in a dynamic-braking circuit-closing position. The reversing switch 80 comprises an electromagnet 82, the movable contact arm 83 that carries movable contact members 84, 85 and 86, which cooperate, respectively, with stationary contact members 87, 88 and 89 and a biasing member 91 for normally holding the cooperating contact members 84 and 87 in engagement. The reversing switch 81 is similar in construction to the reversing switch 80 and comprises an electromagnet 92, the movable contact arm 93, movable contact members 94, 95 and 96 that cooperate with stationary contact members 97, 98 and 99 and a biasing member 101 for normally holding the cooperating contact members 94 and 97 in engagement. The reversing switches 80 and 81 control the operation of the motor 41 in the one or the other direction, in a manner similar to the control of the motor 39 by the reversing switches 51 and 52. The operation of the reversing switches 80 and 81 is controlled by a load-balancing relay 102.

The frequency regulator 75 comprises a centrifugal device 105 that is driven by a synchronous motor 106 which is energized from conductors 11, 12 and 13. The centrifugal device 105 comprises a frame 107 that supports a centrifugal element 108 on a knife-edge bearing 109. Small fly balls 110 are attached to the centrifugal element 108 and, as the speed of the centrifugal device changes, the raising or lowering of the fly balls produces a torque which is transmitted to a lever arm 112 through a bearing 113. The lever arm 112 is pivoted at 114 and carries a movable contact member 115 that cooperates with stationary contact members 116 and 117. The contact members 116 and 117 are carried by pivoted members 118 and 119, respectively, and biasing members 120 and 121 are attached to the pivoted members 118 and 119, respectively, to hold the contact members 116 and 117 out of engagement with the contact member 115. A dash pot 122 is provided to retard the movement of the lever 112, and a weight 123 is provided to partly balance the centrifugal force of the fly balls 110.

Engagement of the contact member 115 with either of the contact members 116 or 117 completes a circuit that energizes the one or the other of the electromagnets 54 and 62 of the reversing switches 51 and 52, respectively.

To enable the regulator to produce a corrective action in proportion to the variation in frequency of the system from the desired value, means are provided to make the length of time of engagement of the contact members vary according to the variation in the frequency of the system from the desired value.

To this end, a synchronous motor 124 is provided that is energized from the conductors 11, 12 and 13 to drive a plurality of meshed gears 125, 126, 127 and 128 through a worm gear 129. Cams 131 and 132 are driven by the gears 125 and 128, respectively, to engage resilient members 133 and 134 that are affixed to the pivoted members 118 and 119, respectively. By these means, the contact members 116 and 117 are made to oscillate up and down, and, when the contact member 115 is deflected, the time of its engagement with either of its cooperating contact members 116 or 117 is a function of the magnitude of the error in the frequency of the system from the desired value.

The synchronous motors 106 and 124 have been illustrated in the conventional form as comprising an armature winding and a field winding but it is to be understood that any type of synchronous motor may be employed, such as those employing shading coils.

The load-balancing relay 102 comprises two electromagnets 136 and 137 and a lever arm 138 that is actuated thereby and is pivoted in the center between the two electromagnets. The lever arm 138 carries movable contact members 141 and 142 that cooperate, respectively, with stationary contact members 143 and 144.

Upon the engagement of the contact members 141 and 143, a circuit is completed, through the operating winding of the electromagnet 92 to actuate the reversing switch 81 to its second operative position. Upon the engagement of the contact members 142 and 144, a circuit is established through the operating winding of the electromagnet 82 to actuate the reversing switch 80 to its second operative position.

The electromagnets 136 and 137 are provided with voltage windings 146 and 147, respectively, which are connected in series-circuit relation to each other and are connected, by means of conductors 148 and 149, to be energized from a potential transformer 151 that is energized in accordance with the voltage of the conductors 16, 17 and 18. The electromagnets 136 and 137 are also severally provided with a pair of differentially wound current windings 152 and 153. The windings 152 are connected in series-circuit relation and are energized in accordance with the current flowing in the conductors 11 and 13 by means of cross-connected current transformers 154. The windings 153 are similarly connected to be energized, in accordance with the current flowing in the conductors 21 and 23, by means of cross-connected current transformers 156.

It is thus seen that the electromagnet 136 is responsive to the power flowing from generator 2, and the electromagnet 137 is responsive to the power flowing from generator 3, and that the relay 102 is actuated in accordance with the difference in the power furnished to the circuit conductors 16, 17 and 18 by the two generators.

The electromagnet 136 is also provided with a pair of differentially-wound windings 158 that are wound to oppose the current-windings 152 and are energized from the potential transformer 159 when the reversing switch 82 is in its second operative position. The electromagnet 137 is provided with a similar pair of differentially related windings 161 that oppose the current windings 153 and are energized from the potential transformer 159 when the reversing switch 81 is in its second operative position.

The operation of the embodiment of my invention illustrated in Fig. 1 is as follows:

When the frequency of the system is at the desired value, the speed of the synchronous motor 106 is such that the centrifugal element 108 is in a horizontal position, and the lever arm 112 has such position that the contact member 115 is mid-way between the contact members 116 and 117. The synchronous motor 124 drives the meshed gears 125 and 128 in the directions shown by the arrows in Fig. 2. The resilient members 133 and 134 are forced inwardly toward the contact member 115 by the cams 131 and 132, respectively, but they do not cause their associated contact members to engage the contact member 115.

During the normal operation of the system, when the load is equally balanced between the generators in proportion to their respective ratings, the forces acting on the electromagnets 136 and 137 will be equal, and the lever arm 138 will be in the neutral position illustrated.

In case the frequency of the system decreases for any reason, such as by an increase in load, the centrifugal element 108 drops downwardly, carrying the lever arm 112 therewith to effect engagement of the contact members 115 and 117, thereby completing a circuit through the electromagnet 62 to operate the switch 52 to its second operative position. The operating circuit for the electromagnet 62 extends from conductor 8, through conductor 165, the lever arm 112, contact members 115 and 117, the pivoted member 119, conductor 166, the operating winding of the electromagnet 62, the contact member 66 of the switch 52 and conductor 73, to the conductor 9.

Upon the operation of the switch 52 to its second operative position, the contact members 64 and 56 are disengaged, and the contact members 63 and 65 are brought into engagement to complete a circuit through the armature windings 42 of the motor 39, thus causing the motor to operate in a direction to so vary the tension of the spring 33 that the valve 29 allows more motive fluid to pass to the prime mover 25 to increase its speed to maintain the frequency of the generator 2 at the desired value. The operating circuit for the motor may be traced from conductor 8, through conductor 69, the contact members 130

65 and 63 and the arms 49 of the reversing switch 52, conductor 47, the armature winding 42 of the motor 39, conductor 46, the arm 48 and the contact members 56 and 58 of the reversing switch 52 and conductor 72, to the conductor 9.

If the variation in the frequency of the system from the desired value is small, the contact member 115 momentarily engages the contact member 117 to produce a corrective action by the regulator 75. If, however, the variation in frequency is large, the contact members 115 and 117 will be held in engagement for a longer period of time because of the action of the cam 132, and a greater corrective action will be effected by the regulator.

If the variation in frequency is very small, the change in the setting of the valve 29 may increase the power output of the generator 2 to such a slight extent that the change in the energization of the electromagnet 136 will not be sufficient to cause engagement of the contact members associated with the relay 102. In such case, the generator 3 would be uneffected and the additional load would be carried by the generator 2.

In case the variation in the frequency in the system from the desired value is large, the frequency regulator 75 changes the setting of the valve 29 to such an extent that a substantial difference exists between the outputs of the two generators 2 and 3. The excess of power flowing from generator 2 over that flowing from generator 3 causes the force tending to move the electromagnet 136 upwardly to be greater than the force tending to move the electromagnet 137 upwardly. As a result of these unequal forces the electromagnet 136 is actuated upwardly to effect the engagement of the contact members 141 and 143, thereby completing a circuit through the operating winding of the electromagnet 92 of the reversing switch 81 to actuate the switch to its second operative position. This circuit may be traced from conductor 8, through conductor 168, lever arm 138, contact members 141 and 143 of the relay 102, conductor 169, the operating winding of the electromagnet 92, the stationary contact member 97 of the switch 81 and conductor 171, to the conductor 9.

The actuation of the switch 81 to its second operative position completes a circuit to operate the motor 41 in such direction as to change the setting of the valve 29, associated with the generator 3, to increase the power output of the generator 3 sufficiently to increase the energization of the electromagnet 137 to bring the lever arm 138 to a balanced neutral position. The operating circuit for the motor 41 may be traced from conductor 8, through conductor 173, contact members 98 and 95 and the arm 93 of the reversing switch 81, conductor 78, the armature winding 43 of the motor 41, conductor 77, the arm 83 and the contact members 84 and 87 of the reversing switch 80 and conductor 176, to the conductor 9.

Actuation of the reversing switch 81 to its second operative position completes a circuit that energizes the windings 158 of the electromagnet 136. The energizing circuit for the windings 158 may be traced from one terminal of the secondary winding of the potential transformer 159, through conductor 178, conductor 179, the serially connected windings 158, conductor 180, contact members 99 and 96 of the reversing switch 81, conductor 181 and conductor 182, to the other terminal of the secondary winding of the potential transformer 159. As the windings 158 are wound in opposition to the current windings 152, the disengagement of the contact members 141 and 143 is hastened, thereby preventing hunting of the load-balancing relay 102.

When the frequency of the system increases above the desired value, the speed of the motor 106 increases, thereby forcing the centrifugal member 108 upwardly. The motion of the element 108 is translated to the lever arm 112 which rises to effect engagement of the contact members 115 and 116, thereby completing a circuit through the operating winding of the electromagnet 54 to actuate the reversing switch 51 to its second operative position. The energizing circuit for the electromagnet 54 may be traced from the conductor 8, through conductor 165, the lever arm 112, contact members 115 and 116, the pivoted member 118, conductor 183, the operating winding of the electromagnet 54, the contact member 58 of the reversing switch 51 and conductor 72, to the conductor 9.

The actuation of the switch 51 to its second operative position disengages the contact members 56 and 58 and effects the engagement of contact members 55 and 57, thereby completing an operating circuit for the motor 42 in the opposite direction from that completed upon the operation of the reversing switch 52, above described. This circuit may be traced from conductor 8, through conductor 68, contact members 57 and 55 and the arm 48 of the reversing switch 51, conductor 46, the armature winding 42 of the motor 39, conductor 47, the arm 49 and the contact members 64 and 66 of the reversing switch 52, and conductor 73, to conductor 9. The motor 39 is, therefore, caused to operate in the reverse direction to so change the tension of the spring 33 that the valve opening is changed and decreases the quantity of motive fluid supplied to the prime mover 25, to decrease the speed of the generator 2, thereby lowering its frequency to the desired value and decreasing its power output.

The duration of the time of engagement of the contact members 115 and 116 depends upon the magnitude of the variation in the frequency from the desired value due to the action of the cam 131, as previously described upon the engagement of the contact members 115 and 117.

The decrease in the power output of the generator 2 causes the force tending to move the electromagnet 137 upwardly to be greater than the force tending to move the electromagnet 136 upwardly. These unequal forces cause the electromagnet 137 to move upwardly and effects engagement of the contact members 142 and 144, thus completing a circuit through the operating winding of the electromagnet 82 to actuate the reversing switch 80 to its second operative position. The energizing circuit for the electromagnet 82 may be traced from conductor 8, through conductor 168, the lever arm 138 and the contact members 142 and 144 of the relay 102, conductor 185, the operating winding of the electromagnet 82, the contact member 87 of the reversing switch 80 and conductor 176, to the conductor 9.

The actuation of the reversing switch 80 to its second operative position disengages the contact members 84 and 87 and effects engagement of the cooperating contact members 85 and 88 and the cooperating contact members 86 and 89, thereby completing a circuit for the motor 41 in the direction opposite to that previously described for the operation of the reversing switch 81. The operating circuit for the motor 41 extends from conductor 8, through conductor 186, contact members 88 and 85 and the arm 83 of the reversing switch 80, conductor 77, the armature winding 43 of the motor 41, conductor 78, the arm 93 and the contact members 94 and 97 of the reversing switch 81 and conductor 171, to conductor 9.

The motor 41 is, therefore, caused to operate in a direction reverse to that previously described to so vary the tension of the spring 33 that the setting of the valve 29 is adjusted to reduce the amount of motive fluid supplied to the prime mover 26. This reduction in motive fluid applied to the prime mover 26 so decreases the power output of the generator 3 that the energization of the electromagnet 137 is decreased and the lever arm 138 is again in a balanced neutral position.

When the contact members 86 and 89 of the reversing switch 80 come into engagement, a circuit is completed for energizing the windings 161 on the electromagnet 137. The energizing circuit for the windings 161 may be traced from one terminal of the secondary winding of the potential transformer 159, through conductor 178, conductor 188, the serially connected windings 161, conductor 189, the contact members 89 and 86 of the switch 80, conductor 190 and conductor 182, to the other terminal of the secondary winding of the potential transformer 159. The energization of the windings 161 opposes the energization of the current windings 153, thereby hastening the disengagement of the contact members 142 and 144 to prevent hunting of the relay 102.

In the embodiment of my invention, illustrated in Fig. 3 of the drawings, load-control relays 200 are associated with each generator to vary the governor setting of the associated prime mover with a change in load to thereby control the division of load between the prime movers and to maintain the frequency of the system at the desired value. Each of the relays 200 comprises an electromagnet 204 that is adapted to actuate a bell-crank lever arm 205 which is pivoted at 206. The lever arm 205 carries a movable contact member 207 that cooperates with two stationary contact members 208 and 209. Engagement of the contact member 207 with either of the contact members 208 and 209 completes a circuit through the one or the other of the electromagnets 82 and 92 of the reversing switches 80 and 81.

Each of the relays 200 is provided with a voltage winding 212 and a pair of differentially wound current windings 214 that are connected in series-circuit relation and are energized in accordance with the current flowing in two of the conductors extending from the associated generator through the agency of cross-connected current transformers 215. The voltage windings 212 of the relays 200 are connected in series-circuit relation to each other and to a variable rheostat 216 and are energized from a potential transformer 217 that is energized in accordance with the voltage of the circuit-supply conductors 16, 17 and 18.

The energizing circuit for the voltage windings 212 extends from one terminal of the secondary winding of the potential transformer 217, through conductor 218, the winding 212 of the relay 200 associated with the generator 2, conductor 219, the winding 212 of the relay 200 associated with generator 3, conductor 220, the rheostat 216 and conductor 222, to the other terminal of the secondary winding of the potential transformer 217.

It is thus seen that the electromagnets 204 are actuated in accordance with the energization of the current windings 214 and the voltage winding 212 and that the movement thereof may be effected by varying the energization of either the current windings or the voltage winding.

Each of the relays 200 is also provided with two windings 225 and 226. The winding 225 is wound in the same direction as the winding 212, and the winding 226 is wound oppositely to the winding 212. One of the windings 225 or 226 is energized from a potential transformer 228 that is energized from the circuit-supply conductors 16, 17 and 18 when the one or the other of the reversing switches 80 and 81 is in its second operative position.

The rheostat 216 is operated by a motor 231 that is controlled by motor-directional relays 232 and 233 in accordance with the operation of the frequency regulator 75. The motor 231 is provided with an amature winding 235 and differentially related series field windings 236 and 237.

The directional relay 232 comprises an electromagnet 238 that is actuated by an operating winding 239, a pivoted lever arm 242 that carries a movable contact member 243 which cooperates with a stationary contact member 244, and a biasing member 245 to hold the contact members 243 and 244, normally, out of engagement. The relay 233 is similar in construction to the relay 232 and comprises an electromagnet 248, an operating winding 249, a lever arm 251, a movable contact member 252, a cooperating fixed contact member 253, and a biasing member 254 for normally holding the contact members 252 and 253 out of engagement.

Engagement of the contact members 115 and 117 of the frequency regulator 75 completes a circuit through the operating winding 239 of the relay 232 to actuate it to a circuit-closing position. Engagement of the contact members 115 and 116 of the regulator 75 completes a circuit through the operating winding 249 of the relay 233 to actuate it to a circuit-closing position.

Engagement of the contact members of either of motor directional relays 232 and 233 completes a circuit through the motor-armature winding 235 and one of the differentially related series field windings 236 and 237 to connect the motor to the battery 10.

The operation of the embodiment of my invention, illustrated in Fig. 3, is as follows:

When each generator is supplying its proportional share of the total power of the station, and the frequency of the station is at the desired value, the energization of the current windings 214 and the voltage winding 212 of each of the relays 200 is such that the lever arms 205 are in balanced neutral positions.

When the load on the system increases, causing the generators to slow down, the frequency of the station falls below the desired value. The decrease in frequency causes the centrifugal element 108 and the lever arm 112 to drop downwardly to effect engagement of the contact members 115 and 117, thereby completing a circuit through the operating winding 239 of the relay 232 to operate the relay, thus effecting engagement of the contact members 243 and 244. The circuit for the operating winding 239 extends from one side of the battery 10, through conductor 165, the lever arm 112, contact members 115 and 117, conductor 256, the winding 239 of the relay 232, conductor 257 and conductor 258, to the other side of the battery 10.

Upon the engagement of the contact members 243 and 244 of the relay 232, a circuit is completed through the armature winding 235 and the field winding 236 of the motor 231 to cause the motor to operate in a direction to increase the resistance in the circuit of the voltage windings 212 of the relays 200.

The operating circuit for the motor 231 may be traced from one side of the battery 10, through conductor 258, conductor 257, lever arm 242, contact members 243 and 244, conductor 259, the field winding 236 of the motor 231, conductor 261, the armature winding 235 of the motor 231 and conductor 262, to the other side of the battery 10.

The increase of resistance in the circuit of the voltage windings 212 decreases the current flowing therethrough, and the energization thereof decreases, causing the electromagnets 204 to move downwardly. The downward movement of the electromagnets 204 causes the engagement of contact members 207 and 208, thereby establishing circuits through the operating windings of the electromagnets 92 of the reversing switches 81 and actuating them to their second operative positions.

Each of the operating circuits for the electromagnets 92 may be traced from conductor 8, through conductor 186, conductor 264, the lever arm 205 and the contact members 207 and 208 of the relay 200, conductor 265, the operating winding of the electromagnet 92, the stationary contact member 97 of the switch 81 and conductor 171, to the conductor 9.

When the switches 81 are actuated to their second operative positions, circuits are established for operating the motors 39 and 41 in such directions or to vary the tension of the springs 33, thereby changing the settings of the governor mechanisms 27 to permit more motive fluid to enter the prime movers 25 and 26. The increase in motive fluid supplied to the prime movers increases the speeds of the generators thereby raising the frequency of the system to the desired value and increasing the outputs of the generators. The increase in the outputs of the generators increases the energization of the current windings 214 of the relays 200 thereby actuating the electromagnet 204 to balanced neutral positions.

The circuits established for operating the motors 39 and 41, on the actuation of the switches 81 to their second operative positions, are similar to those described in connection with Fig. 1.

When the contact members 96 and 99 are brought into engagement, upon the operation of the switches 81 to the second operative positions, circuits are completed through the windings 225 on the relays 200. Each of the circuits for energizing the windings 225 extends from one terminal of the secondary winding of the potential transformers 228, through conductor 267, conductor 268, winding 225 of the relay 200, conductor 269, the contact members 99 and 96 of the switch 81, conductor 270 and conductor 271, to the other terminal of the secondary winding of the potential transformer 228. As the windings 225 are wound in the same direction as the windings 212, the disengagement of the contact members 207 and 208 is hastened, thereby preventing the relays 200 from hunting.

As the change in load and frequency affects each relay 200, each generator will supply its share of the increased power necessary to supply the increased load demand. The percentage of the total power of the station supplied by each generator may be adjusted by setting the relays 200 at different values.

When the load on the system decreases, the generators speed up, and the frequency of the station increases above the desired value. The increase in frequency causes the centrifugal element 108 and the lever arm 112 of the regulator 75 to rise, causing engagement of the contact members 115 and 116, thereby completing a circuit through the operating winding 249 of the relay 233 to operate the relay and thereby effect engagement of the contact members 252 and 253. The operating circuit for the winding 249 extends from one side of the battery 10, through conductor 165, the lever arm 112 and the contact members 115 and 116 of the regulator 75, conductor 272, the winding 249 of the relay 233, conductor 273 and conductor 258, to the other side of the battery 10. Upon the engagement of the contact members 252 and 253, a circuit is completed to operate the motor 231 in a direction opposite to that previously described upon the operation of relay 232 to decrease the resistance in the circuit of the voltage windings 212 of the relays 200. This motor-operating circuit may be traced from one side of the battery 10, through conductor 258, conductor 273, the lever arm 251 and the contact members 252 and 253 of the relay 233, conductor 274, the field winding 237 of the motor 231, conductor 261, the armature winding 235 of the motor 231 and the conductor 262, to the other side of the battery 10.

The decrease in resistance of the voltage windings 212 causes an increase in the current flowing therethrough and increases the energization thereof, causing the electromagnets 204 to move upwardly. The upward movement of the electromagnets 204 effects the engagement of the contact members 207 and 209 of each relay 200, thereby establishing circuits through the operating windings of the electromagnets 82 of the reversing switches 80 and actuating them to their second operative positions.

Each of the circuits for energizing the electromagnets 82 may be traced from conductor 8, through conductor 186, conductor 264, the lever arm 205 and contact members 207 and 209 of the relay 200, conductor 276, the operating winding of the electromagnet 82, and the stationary contact member 87 of the switch 80 and conductor 176, to the conductor 9.

Upon the actuation of the reversing switches 80 to their second operative positions, circuits are established for operating the motors 39 and 41 similar to those described in connection with Fig. 1. The motors 39 and 41 actuate the gear wheels 35 to change the tension of the springs 33, thereby changing the settings of the governor mechanisms 27 to decrease the amount of motive fluid entering the prime movers 25 and 26. This decrease in prime-mover input causes the generators to slow down thereby decreasing their outputs and lowering the frequency of the system to the desired value. The energization of the current windings 214 of the relays 200 is decreased with a decrease in outputs of the generators and the electromagnets 204 move to neutral positions.

When the reversing switches 80 are actuated to their second operative positions, the cooperating contact members 86 and 89 of each switch are brought into engagement, thereby completing circuits through the windings 226 on the relays 200. The circuit for energizing a winding 226 may be traced from one terminal of the secondary winding of the potential transformer 228, through conductor 267, the winding 226 of the relay 200, conductor 278, contact members 89 and 86 of the reversing switch 80, conductor 279 and conductor 281, to the other terminal of the secondary winding of the potential transformer 228. As the windings 226 are wound in the opopsite direction to the windings 212, the energization of the electromagnets 204 is decreased, thereby hastening the disengagement of the contact members 207 and 209 to prevent the relays 200 from hunting.

In the embodiment of my invention illustrated in Fig. 4 of the drawings, the relays 102 balance the output of each generator against the total output of all generators.

The voltage windings 146 of the electromagnet 136 of each relay 102 are connected in series-circuit relation to each other and to the resistor 216 and are energized from the potential transformer 151. The circuit for energizing the voltage windings 146 extends from one terminal of the potential transformer 151, through conductor 282, the winding 146 of the relay 102 associated with the generator 2, conductor 283, the winding 146 of the relay 102 associated with the generator 3, conductor 284, the resistor 216 and conductor 285, to the other terminal of the potential transformer 151.

The voltage winding 147 of the electromagnets 137 of each relay 102 are connected in series-circuit relation to each other and are energized from the potential transformer 151. The circuit for energizing the voltage windings 147 extends from one terminal of the potential transformer 151, through conductor 282, conductor 287, the winding 147 of the relay 102 associated with the generator 3, conductor 288, the winding 147 of the relay 102 associated with the generator 2, conductor 289 and conductor 285, to the other terminal of the potential transformer 151. The serially connected current windings 152 of the electromagnets 136 of each relay 102 are energized in accordance with the current flowing in two conductors extending from the associated generator through the agency of the cross-connected current transformers 215. The serially connected windings 153 of the electromagnets 137 of each relay 102 are all connected in series-circuit relation and are energized in accordance with the current flowing through two of the circuit-supply conductors 16, 17 and 18 through which the entire output of the station flows through the agency of cross-connected current transformers 292.

The circuit for energizing the serially connected windings 153 of the electromagnets 137 extends from one terminal of the secondary windings of the cross connected transformers 292, through conductor 294, windings 153 of the relay 102 associated with generator 2, conductor 295, windings 153 of the relay 102 associated with generator 3 and conductor 296, to the other terminal of the secondary windings of the cross-connected current transformers 292.

The energization of the electromagnet 136 is responsive to the power flowing from the associated individual generators and varies with the setting of the rheostat 216, while the energization of the electromagnet 137 is responsive to the total power output of all the generators. It is thus seen that the left-hand elements of the relays 102 are affected by a change in the frequency of the station while the right-hand elements of the relays 102 are only affected by a change in the total output of the station. The relays 102 are so calibrated that the lever arms 138 are in balanced neutral positions when each generator is supplying a portion of the total power to the circuit-supply conductors 16, 17 and 18 that is proportional to the rating of the respective generators.

The operation of this embodiment of my invention illustrated in Fig. 4, is as follows:

When the load demand on the system increases and the frequency falls, the energization of the current windings 153 of the right-hand elements of the relays 102 increases, which tends to actuate the electromagnet 137 upwardly. The resistance of the circuit of the voltage windings 146 of the left-hand elements of the relays 102 increases, which decreases the energization of the windings 146 in a manner similar to that hereinbefore described in connection with Fig 3, and the electromagnets 36 tend to move downwardly. As the electromagnet 136 tends to move downwardly and the electromagnet 137 tends to move upwardly, the contact members 142 and 144 are brought into engagement thereby establishing circuits through the operating windings of the electromagnets 92 of the reversing switches 81 to actuate them to their second operative positions and operating the motors 39 and 41 in a manner previously described.

Each of the operating circuits for the electromagnets 92 may be traced from the supply conductor 8, through conductor 168, the lever arm 138, the contact members 142 and 144, conductor 302, the operating winding of the electromagnet 92, the stationary contact member 97 of the switch 81 and conductor 171 to the supply conductor 9.

The operation of the motors 39 and 41 changes the setting of the governor mechanisms 27 to increase the input of motive fluid to the prime movers 25 and 26 and increase the speeds of the generators, thereby raising the frequency of the system to the desired value and supplying the necessary extra power to the system.

The contact members 96 and 99 of the switches 81, upon engagement, complete circuits through the anti-hunting windings 161 of the electromagnets 137. Each of the energizing circuits for the windings 161 extends from one terminal of the secondary winding of the potential transformer 159, through conductor 303, conductor 304, the serially connected windings 161, conductor 305, the contact members 99 and 96 of the switch 81, conductor 306, and conductor 307 to the other terminal of the secondary winding of the potential transformer 159.

As the windings 161 are wound in opposition to the current windings 153 the forces acting to hold the electromagnets 137 up are decreased and the disengagement of the contact members 142 and 144 of each relay is hastened thereby preventing hunting action.

When each machine is furnishing its share of the increased load, the two elements of each of the relays 102 are again in balanced neutral positions and the corrective action ceases.

When the load demand on the system decreases and the frequency increases, the energization of the current windings 153 of the relays 102 decreases and the resistance of the circuits of the voltage windings 146 decreases thereby increasing the energization of the windings 146. The electromagnets 136 are actuated upwardly to effect engagement of the contact members 141 and 143 thereby establishing circuits through the operating windings 82 of the reversing switches 81 to actuate them to their second operative positions and operating the motors 39 and 41.

Each of the operating circuits for the electromagnets 82 may be traced from the supply conductor 8, through conductor 168, the lever arm 138, the contact members 141 and 143, conductor 312, the operating winding of the electromagnet 82, the stationary contact member 87 of the switch 80 and conductor 176 to the supply conductor 9.

The operation of the motors 39 and 41 changes the setting of the governor mechanisms 27 to decrease the motive fluid supplied to the prime movers 25 and 26 and decrease the speeds of the generators, thereby decreasing the power output of each generator and decreasing the frequency of the station to the desired value.

The contact members 86 and 89 of the switches 80, upon engagement, complete circuits through the anti-hunting windings 158 of the electromagnets 136. Each of the energizing circuits for the windings 158 extends from one terminal of the secondary winding of the potential transformer 159, through conductor 303, conductor 313, the serially connected windings 158, conductor 314, the contact members 89 and 86 of the switch 80, conductor 315 and conductor 307 to the other terminal of the secondary winding of the potential transformer 159.

As the windings 158 are wound in opposition to the current windings 152, the forces actuating the electromagnets 136 upwardly are decreased, thereby hastening the disengagement of the contact members 141 and 143 of each relay to prevent hunting action.

When the output of each generator has been decreased so that each generator is furnishing its proportionate share of power to the system, the energization of the two electromagnets 136 and 137 of the relays 102, are equal, and the lever arms 138 of the relays are in balanced neutral positions.

Since many modifications and variations may be made in the details of apparatus and circuits from those which I have illustrated and described, without departing from the spirit of my invention, I do not wish to be limited otherwise than by the scope of the appended claims.

I claim as my invention:

1. In combination, a plurality of prime movers, a plurality of generators driven thereby and connected to a power system, a plurality of speed governors for controlling said prime movers, regulating means responsive to changes in the frequency of the system for actuating means to change the governor settings upon a change in the frequency of the system to maintain said frequency substantially constant, electro-magnetic load-responsive means for maintaining a predetermined load division between said generators, and antihunting means associated with the regulating means and with the load-responsive means.

2. In combination, a plurality of electric generators connected to supply power to a power system, a prime mover for driving each generator, a speed governor for controlling the prime mover associated with each generator, means for varying the setting of one of said governors and the output of its associated generator in response to a change in the frequency of said system and means actuated by the change in the generator output for effecting a change in settings of the other governors for changing the outputs of the other generators to maintain the frequency of the system substantially constant and a predetermined load division between the generators.

3. In combination, a plurality of electric generators connected to supply power to a power system, a plurality of prime movers for driving said generators, a speed governor for controlling the prime mover associated with each generator, means for varying the setting of each governor, means responsive to variations in the frequency of the system for actuating a certain one of said governor-setting varying means and the output of its associated generator upon the variation of said frequency from the desired value, and electro-magnetic load-responsive means actuated by the difference between the output of the generator variable in response to frequency changes and the remaining generators for actuating the governor-setting varying means associated with the remaining generators for so changing the power input to their associated prime movers that the frequency of the system is maintained substantially constant and a predetermined load division between the generators is maintained.

4. In combination, a plurality of prime movers, a plurality of generators driven thereby and connected to a power system, a plurality of speed governors for governing the power supplied to the prime movers, means for varying the setting of each governor, regulating means for controlling the operation of a certain one of said governor-setting varying means and the output of its associated generator, said regulating means being responsive to variations of the system frequency from a predetermined value, a plurality of electro-magnetic load-responsive means for controlling the operation of the remaining governor-setting varying means comprising two electromagnets, one of said electromagnets being energized in accordance with the power flowing from the regulator controlled generator and the other electromagnet being energized in accordance with the power flowing from one of the remaining generators, the energization of the two electromagnets holding the load-responsive means in an inoperative position when a predetermined load division on the generators exists.

5. In combination, a plurality of prime movers, a plurality of generators driven thereby and connected to a power system, a plurality of speed governors for governing the power supplied to the prime movers, means for varying the setting of each governor, regulating means for controlling the operation of a certain one of said governor-setting varying means and the output of its associated generator, said regulating means being responsive to variations of the system frequency from a predetermined value, a plurality of electro-magnetic load-responsive means for controlling the operation of the remaining governor-setting varying means comprising two electromagnets, one of said electromagnets being energized in accordance with the power flowing from the regulator controlled generator and the other electromagnet being energized in accordance with the power flowing from one of the remaining generators, the energization of the two electromagnets holding the load-responsive means in an inoperative position when a predetermined load division on the generators exists and means for modifying the magnetization of the electromagnets to prevent hunting action.

6. In combination, a plurality of electric generators connected to a power system, a plurality of prime movers for driving said generators, a plurality of speed governors for controlling the power supplied to the prime movers, means for varying the setting of each governor, electro-responsive means associated with each generator for controlling the operation of the governor-setting varying means, each electro-responsive device being provided with two differentially related windings energized in accordance with current flowing from its associated generator and a winding energized in accordance with the voltage of the system, means responsive to the variations in the frequency of the system from a predetermined value for changing the energization of the electro-responsive device caused by the voltage winding to effect a change in the setting of the governors to maintain the frequency of the system substantially constant.

7. In combination, a plurality of electric generators connected to a power system, a plurality of prime movers for driving said generators, a speed governor for controlling the power supplied to each prime mover, motor operated means for varying the setting of each governor, electro-responsive means associated with each generator for controlling the operation of its associated motor and provided with two differentially related windings energized in accordance with the current flowing from the associated generator and a winding energized in accordance with the voltage of the system, a variable resistor connected in circuit with the voltage windings to vary the effect of the voltage winding on the electro-responsive means, a frequency regulator responsive to the variations in the system frequency from a predetermined value to actuate means for varying the value of said resistor to maintain the system frequency substantially constant.

8. In combination, a plurality of prime movers, an electric generator driven by each prime mover and connected to a power system, a governor for controlling the power supplied to each prime mover and motor operated means for varying the setting of each governor, electro-responsive means associated with each generator for controlling the operation of its associated motor and provided with two differentially related windings energized in accordance with the current flowing from the associated generator and a third winding that is connected in series-circuit relation to a motor operated rheostat and energized in accordance with the voltage of the system, regulator means responsive to the variations in the frequency of the system from a predetermined value for controlling the operation of the rheostat motor, the energization of the electro-responsive devices changing with the variations in the frequency of the system from the predetermined value for effecting a change in the governor settings to maintain the system frequency substantially constant.

9. In combination, a plurality of prime movers, an electric generator driven by each prime mover and connected to a power system, a governor for controlling the power supplied to each prime mover and motor operated means for varying the setting of each governor, electro-responsive means associated with each generator for controlling the operation of its associated motor and provided with two differentially related windings energized in accordance with the current flowing from the associated generator and a third winding that is connected in series-circuit relation to a motor operated rheostat and energized in accordance with the voltage of the system, regulator means responsive to the variations in the frequency of the system from a predetermined value for controlling the operation of the rheostat motor, the energization of the electro-responsive devices changing with the variations in the frequency of the system from the predetermined value for effecting a change in the governor settings to maintain the system frequency substantially constant and means for varying the magnetization of the electro-responsive means to prevent hunting action.

10. In combination, a plurality of prime movers, a plurality of generators driven thereby and connected to a power system, a governor for governing the power supplied to each prime mover, means for varying the setting of each governor, electro-magnetic load-responsive means associated with each generator for controlling the operation of the governor-setting varying means and comprising two electromagnets, one electromagnet being energized in accordance with the power flowing from its associated generator and the other electromagnet being energized in accordance with the total power flowing from all generators, means responsive to the variations in the frequency of the system from a predetermined value for changing the energization of the electromagnets that are responsive to the power flow from their respective generators with a change in the system frequency to so alter the governor settings that substantially constant frequency is maintained.

11. In combination, a plurality of electric generators connected to a power system, a plurality of prime movers therefor, a governor associated with each prime mover, a motor operated means for varying the setting of each of said governors, electro-magnetic load-responsive means associated with each generator for controlling the operation of said motor comprising two electromagnets each having a pair of differentially related windings and a third winding, the two pairs of windings being respectively energized in accordance with the current flowing from the associated generator and the total current of the system, the third winding of each electromagnet being energized in accordance with the voltage of the system, means responsive to variations in the frequency of the system from a predetermined value for actuating means to vary the energization caused by the voltage windings of the electromagnets that are energized in accordance with the current flowing from the generators to actuate the governor setting varying means to so vary the governor settings that the system frequency is maintained substantially constant.

In testimony whereof, I have hereunto subscribed my name this 19th day of September, 1930.

RALPH A. GEISELMAN.

DISCLAIMER 1,863,302.—*Ralph A. Geiselman*, Wilkinsburg, Pa. REGULATOR SYSTEM. Patent dated June 14, 1932. Disclaimer filed January 22, 1936, by the assignee, *Westinghouse Electric & Manufacturing Company*.

Hereby enters this disclaimer to claims 2 and 3 of the patent specification.
[*Official Gazette February 25, 1936.*]